United States Patent [19]

Tholen

[11] 4,112,684
[45] Sep. 12, 1978

[54] MULTIPLE WORKING CHAMBER FORMING COMBUSTION MACHINE WITH EXHAUST TURBO CHARGER

[75] Inventor: Paul Tholen, Bensberg-Refrath, Fed. Rep. of Germany

[73] Assignee: Klöckner-Humboldt-Deutz Aktiengesellschaft, Cologne, Fed. Rep. of Germany

[21] Appl. No.: 698,312

[22] Filed: Jun. 22, 1976

[30] Foreign Application Priority Data

Jun. 23, 1975 [DE] Fed. Rep. of Germany ....... 2527871

[51] Int. Cl.² .............................................. F02B 37/00
[52] U.S. Cl. ......................................... 60/606; 60/612
[58] Field of Search ................. 60/605, 606, 612, 613, 60/599, 609, 610, 39.17, 608

[56] References Cited

U.S. PATENT DOCUMENTS

| 2,173,595 | 9/1939 | Schutte | 60/606 |
| 2,633,698 | 4/1953 | Nettel | 60/599 |
| 3,174,275 | 3/1965 | Collin | 60/599 |

FOREIGN PATENT DOCUMENTS 518,561  11/1955  Canada ..................................... 60/612

Primary Examiner—Louis J. Casaregola
Attorney, Agent, or Firm—Walter Becker

[57] ABSTRACT

A controllable bypass conduit connects the compressor with the exhaust or discharge system and this bypass conduit communicates there in a range of lower pressure on a combustion machine having working chambers formed with a discharge turbo charger. The bypass conduit communicates into a mixing zone of a pulse converter embodied as an underpressure zone.

1 Claim, 3 Drawing Figures

MULTIPLE WORKING CHAMBER FORMING COMBUSTION MACHINE WITH EXHAUST TURBO CHARGER

The present invention relates to a combustion machine forming several working chambers with an exhaust or waste gas turbo charger with which a controllable bypass conduit connects the pressure side of the compressor with the discharge system and there opens or vents into a region of lower pressure.

With combustion machines having a single step or multiple step discharge turbo super charger means, there is known in predetermined operating ranges to admix a portion of the conveyed combustion air subject to circumventing of the combustion machine as to the discharge before the discharge turbine. Reference can be made to foreign German disclosure Nos. 614,348 and 2,038,810 as well as 1,120,687 for such previously known arrangements.

Difficulties are encountered due to the requirement for assuring a positive pressure drop between charging air conduits and discharge conduits in all operating points. Generally, special control valves or pressure reducing devices are necessary for this purpose in the discharge conduit. The object of the present invention is to provide the discharge control with the lowest possible energy loss as to fresh air while utilizing conventional structural configuration. This object becomes inventively resolved thereby that the bypass conduit empties into a mixing zone of a pulse converter embodied as an underpressure zone. With a pulse converter the pressure pulses or shocks of the exhaust become converted into high speed in an ejector nozzle so that a zone of lower pressure becomes generated in a mixing pipe adjacent thereto. Thereafter, the speed is again converted in a diffuser into pressure before the exhaust becomes supplied by way of a storage volume as to the turbine. Inventively, the mixing zone of a pulse converter is especially suited for storing the compressed fresh air without special control elements being necessary.

A further solution of the inventive object consists therein that the connection conduit empties in the region or range of the distributor or diaphragm respectively the inlet spiral of the discharge or exhaust turbine. As a rule, an acceleration of the discharge flow occurs here. Hereby, the pressure likewise becomes reduced and good conditions result for the charging of fresh air.

With multiple step discharge or exhaust turbo chargers, there is advantageous in the embodiment of the invention that the bypass conduit is arranged between the higher compressor step and a lower turbine step. Through these measures there is likewise made possible that in all operating points there exists a pressure drop from the branch-off location of the fresh air conduit to the emptying location in the discharge conduit.

Naturally, there is also possible to combine the indicated measures, in other words for example to supply or feed a partial flow or component current into the pulse converter and the other partial flow or component current into the inlet spiral of the turbine.

By way of the inventive solutions there can be attained suitably subject to including a combustion chamber that the volume flow becomes maintained constant to a great extent by way of the discharge turbo charger under all motor requirements. Accordingly, the maintaining of an optimum efficiency or degree of effectiveness of the discharge turbo charger is made possible.

These objects and other objects and advantages of the present invention will appear more clearly from the following specification in connection with the accompanying drawings in which.

Figure 1:
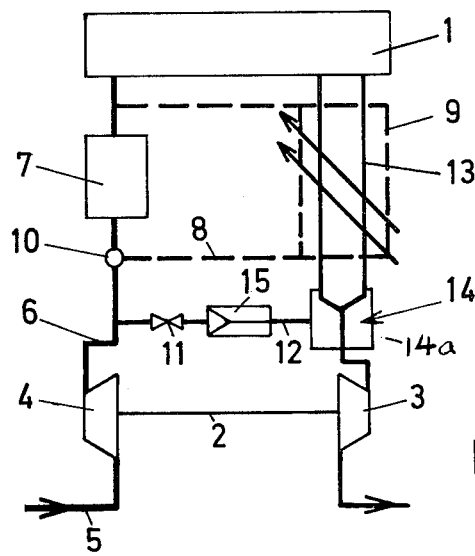
FIG. 1 shows schematically an inventive multiple cylinder stroke-piston combustion machine with which fresh air becomes fed into the mixing zone of a pulse converter.

Parts which operate in the same manner are provided with the same reference designations in all views subject to adding of a a ' or "in differing views.

A multi-cylinder stroke-piston internal combustion engine or machine 1 is schematically indicated in the drawing and in place thereof there can also be provided a rotary piston internal combustion machine forming multiple working chambers; a discharge or waste gas turbo charger 2 charges the combustion engine 1 and an exhaust gas turbine 3 and compressor 4 are provided therewith. The compressor suctions or draws fresh air by way of a suction conduit 5 and conveys the compressed air by way of a pressure conduit 6 and a charge air cooler 7 into the suction or intake system of the stroke-piston combustion engine 1. During the start and partial load range there is advantageous when the compressed fresh air does not become cooled but rather becomes heated additionally according to requirements or need. A bypass conduit 8 serves this purpose by means of which in the noted operating ranges the compressed fresh air becomes guided subject to bypassing the charge air cooler 7 through a discharge or waste gas heat exchanger 9 and becomes supplied to the motor as heated or warmed. By way of a valve 10 there can be determined automatically dependent on temperature, the quantity which flows through the charge air cooler respectively which flows through the discharge or waste gas heat exchanger so that in wide limits there can be attained an optimum temperature of the charging air.

For control of the compressor 4 there is provided a control valve 11 on the pressure side which controls a bypass conduit or line 12. This connects the pressure line or conduit 6 with the discharge side of the internal combustion engine or machine 1. The discharge system of the internal combustion engine in the embodiment according to FIG. 1 consists of individual exhaust gas lines 13 which are combined or unified shortly before entry into the discharge or exhaust gas turbine 3 in a pulse converter 14. The bypass line 12 empties into the mixing zone 14a of the pulse converter 14 embodied as an underpressure zone. A combustion chamber 15 is arranged in the bypass line 12 for raising or increasing the discharge or waste gas energy.

Figure 2:
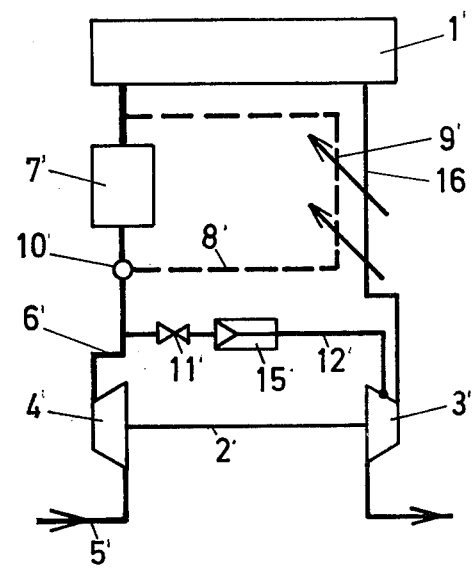
FIG. 2 shows also schematically an inventive stroke-piston combustion machine with which compressed fresh air becomes fed or supplied in the range of the distributor of the discharge turbine.

The embodiment according to FIG. 2 differs from that of FIG. 1 thereby that in place of the individual discharge or waste gas lines 13 and the pulse converter 14 there is provided a common exhaust gas collecting pipe or conduit means 16 and that the bypass line 12' in the range of the distributor or diaphragm of the waste gas turbine 3' empties into the dishcarge or waste gas system.

Figure 3:
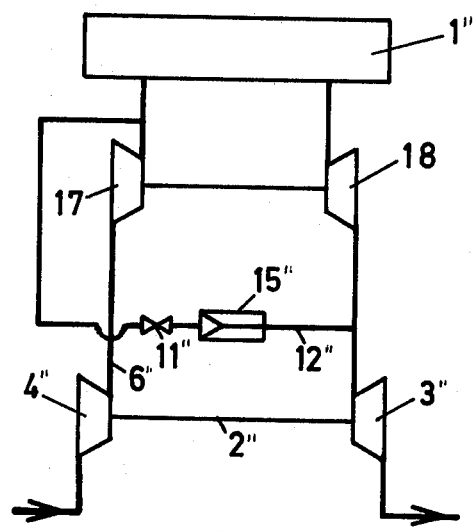
FIG. 3 shows an inventive multi-cylinder stroke-piston combustion machine with multiple step discharge or exhaust tubo charging with which compressed fresh air becomes supplied or fed as to a higher compressor step before a lower discharge turbine step.

The embodiment according to FIG. 3 shows a multi-cylinder stroke-piston internal combustion engine with a two-step discharge or waste gas turbo charger. The waste gas turbine of the lower pressure step is designated by reference numeral 3" and the compressor is designated by reference numeral 4". A pressure line 6" leads from the compressor 4" to a compressor 17 of the high pressure step having a waste gas turbine 18 arranged therewith. As a rule, the waste gas turbine 18 of the high pressure step becomes operated in the impact or shock range while the post connected waste gas turbine 3" operates in the low pressure step in the accumulator (stagnation or dynamic air pressure) operation. For simplification of the illustrations, there is noted that in the drawings the arrangement of charging air coolers and intermediate coolers as well as waste gas heat exchangers were left unillustrated. Naturally, charging air coolers and waste gas heat exchangers can also be utilized with a multiple step, one or multiple housing waste gas turbo in an advantageous manner. The bypass line 12" leads from the pressure side of the compressor 17 of the high pressure step to the pressure side of the waste turbine 3" of the low pressure step. Thereby there becomes attained in any event as with the other arrangements that without additional control means in all operating ranges of the bypass conduit 12, there exists a pressure drop from the fresh air side to the discharge or waste gas side.

It is, of course, to be understood that the present invention is, by no means, limited to the specific showing in the drawings, but also comprises any modifications within the scope of the appended claims.

What we claim is:

1. In combination, an internal combustion engine forming multiple working chambers, a multi-stage exhaust gas turbocharger having high and low pressure compressor and turbine stages, and a controllable bypass line between the pressure side of the high pressure compressor stage and the exhaust gas system wherein the bypass line empties into a zone of low pressure, between the high and low pressure turbine stages, the pressure of compressed air being higher than exhaust gas pressure when the bypass line branches off behind the high pressure stage of the compressor and before the low pressure stage of the turbine.

* * * * *